May 22, 1923.

S. D. BRACKEN

ICE CREAM CUTTING MACHINE

Filed March 15, 1922    4 Sheets-Sheet 1

1,455,988

Inventor
Silas D. Bracken,
By
Attorney

May 22, 1923.

S. D. BRACKEN 1,455,988

ICE CREAM CUTTING MACHINE

Filed March 15, 1922    4 Sheets-Sheet 2

Inventor

Silas D. Bracken,

By

Attorney

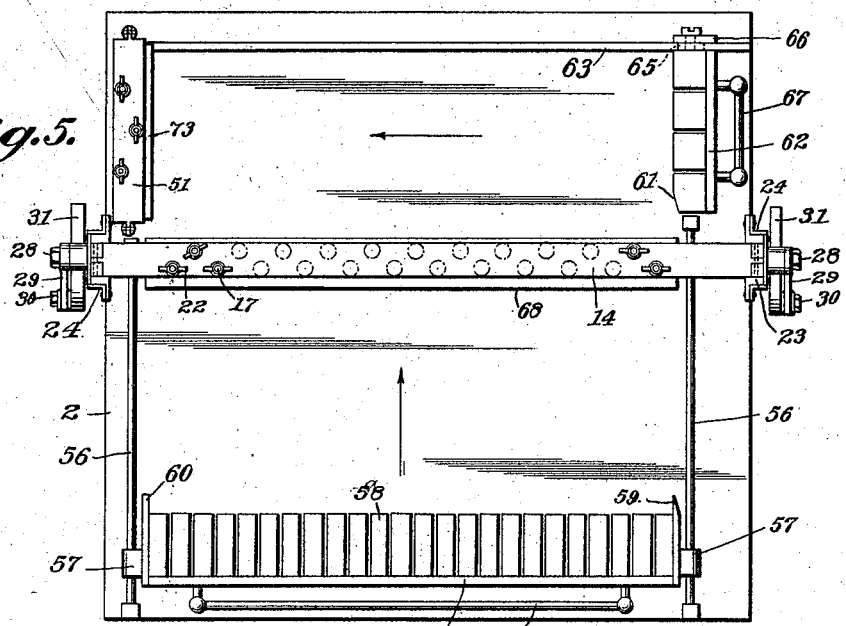
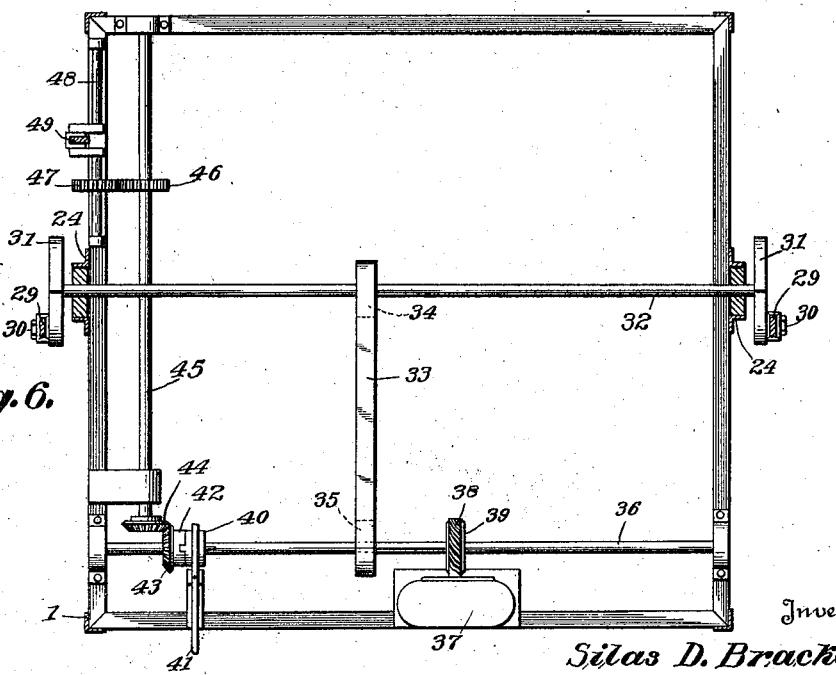

May 22, 1923.  
S. D. BRACKEN  
ICE CREAM CUTTING MACHINE  
Filed March 15, 1922  
1,455,988  
4 Sheets-Sheet 4

Inventor  
Silas D. Bracken,  
By

Patented May 22, 1923.

1,455,988

UNITED STATES PATENT OFFICE.

SILAS D. BRACKEN, OF JOHNSTOWN, PENNSYLVANIA.

ICE-CREAM-CUTTING MACHINE.

Application filed March 15, 1922. Serial No. 543,906.

*To all whom it may concern:*

Be it known that I, SILAS D. BRACKEN, a citizen of the United States, residing at Johnstown, in the county of Cambria and State of Pennsylvania, have invented new and useful Improvements in Ice-Cream-Cutting Machines, of which the following is a specification.

The invention relates to an ice cream cutting machine.

The object of the present invention is to improve the construction of ice cream cutting machines and to provide a simple, practical and efficient ice cream cutting machine of comparatively inexpensive construction adapted to rapidly and accurately cut a slab of ice cream into blocks or pieces of any uniform size and weight for the manufacture of Eskimo pie, bricks and the like, whereby slabs of ice cream may be easily and quickly handled and cut into pieces of the same size and weight.

A further object of the invention is to provide an ice cream cutting machine of this character, capable of cutting a slab of ice cream both longitudinally and transversely of the machine and adapted to enable the slab to be moved over the table of the machine for passing it between spaced vertical knives or cutters without liability of the slab adhering to the table through the freezing of the ice cream on the same.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 5 is a plan view of the machine.

Figure 6 is a horizontal sectional view through the lower portion of the machine.

Figures 1, 2:
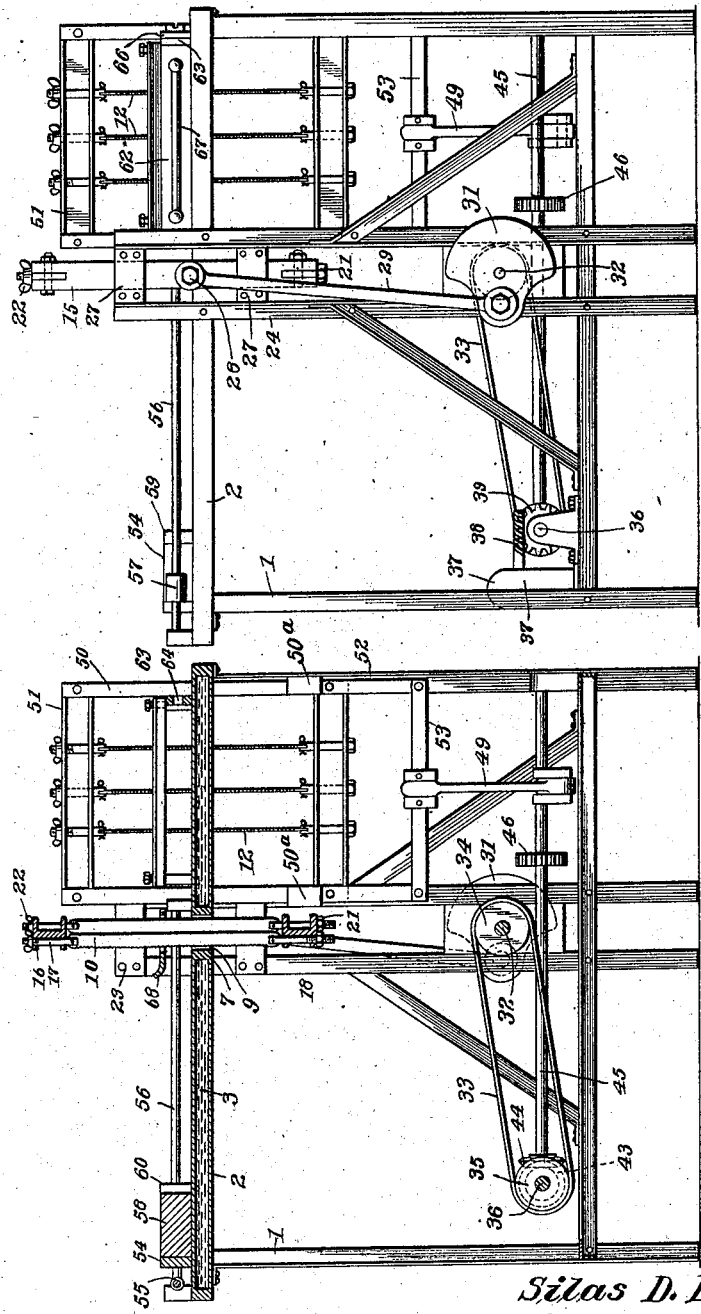
Figure 1 is a side elevation of an ice cream cutting machine constructed in accordance with this invention.
Figure 2 is a longitudinal sectional view of the same.
Figure 3:
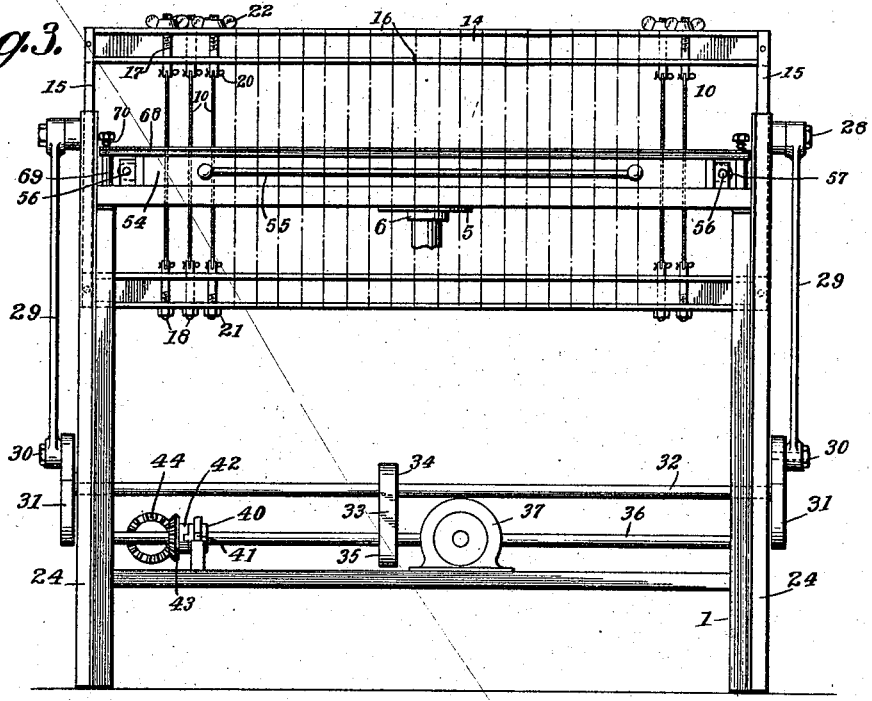
Figure 3 is a front elevation of the ice cream cutting machine.
Figure 4:
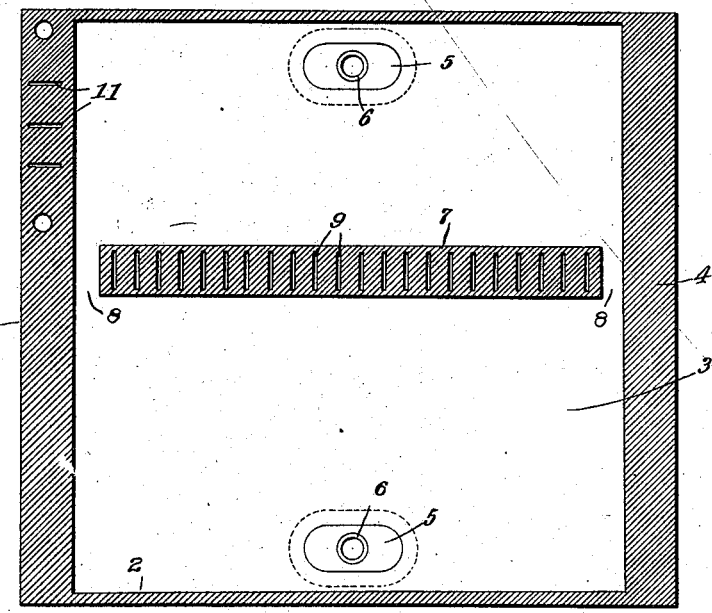
Figure 4 is a horizontal sectional view of the table.
Figure 7:
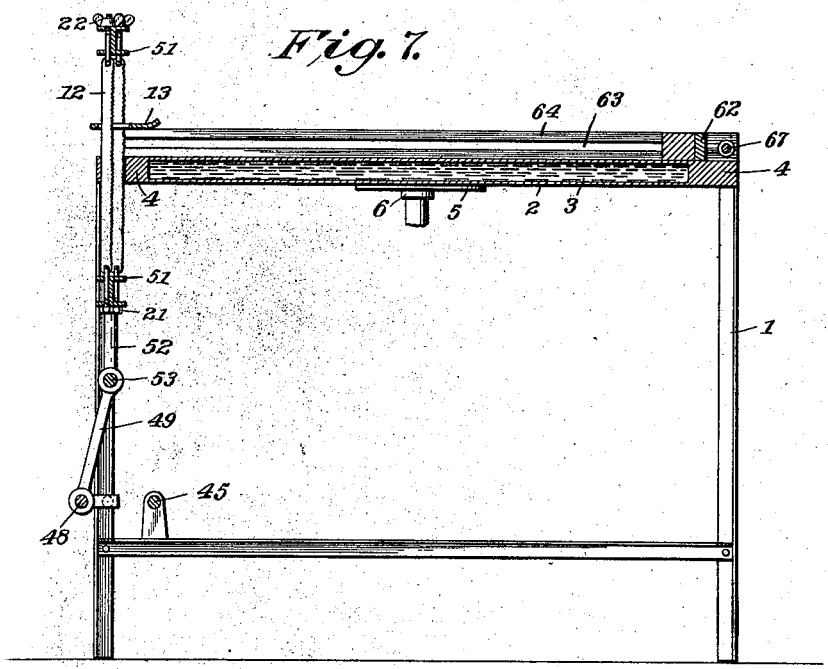
Figure 7 is a transverse sectional view of the ice cream cutting machine.
Figure 8:
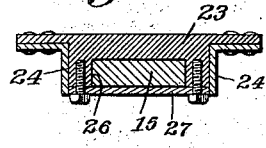
Figure 8 is a detail view of one of the horizontal guides of the transversely disposed cutting frame.
Figure 9:
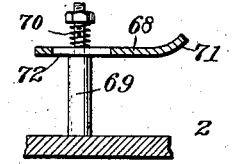
Figure 9 is a detail sectional view illustrating the manner of mounting the combined presser member and guard.
Figure 10:
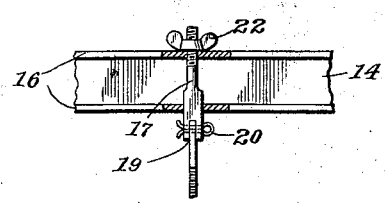
Figure 10 is a detail view illustrating the manner of adjustably mounting the saw blades.
Figure 11:
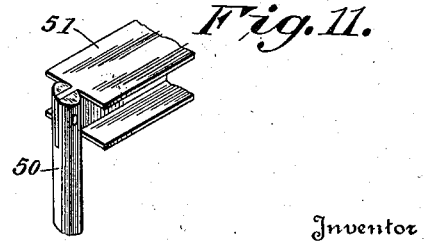
Figure 11 is a detail view of a portion of the side cutting frame.

In the accompanying drawings, in which is illustrated the preferred embodiment of the invention, the ice cream cutting machine comprises in its construction a main frame 1 constructed of angle iron or other suitable material and supporting a horizontal table 2, preferably consisting of a casting but the table may be constructed of any other suitable material. The table 2, which is hollow to provide an interior chamber 3, is designed to contain water at a temperature which will prevent the ice cream from freezing upon and adhering to the table and by this means the ice cream will be enabled to be moved rapidly over the table without employment of a supporting carriage or similar means for holding the ice cream while the same is being cut, as hereinafter described. The main frame is preferably composed of vertical bars or posts and horizontally connecting members and it may be braced in any desired manner as shown and the upper ends of the posts or vertical members are bolted or otherwise secured to the table 2, which is preferably provided at opposite sides with solid portions 4 forming thickened walls and adapted to permit the table to be pierced and tapped at opposite sides for bolts and other suitable fastening devices for securing the frame work and other fixed members of the machine to the table. The table is preferably provided at the bottom with removable plates 5 located at the front and back of the table and adapted to provide access to the interior of the table for convenience in casting the same and the said plates are also provided with suitable nipples 6 for the connection of suitable pipes or tubes for enabling water of the required temperature to be circulated through the table to maintain the latter at the desired temperature. The table is also provided at its interior with a solid transverse connecting portion 7 terminating at its ends with spaced relation with the thickened side portions 4 to provide intervening spaces or passages 8 for the circulation of the water, and the said transversely disposed integral connecting portion 7 is provided at intervals with slots or openings 9 for the passage of a transverse series of vertically reciprocating cutters 10, which are movable through the slots or openings 9 for cutting the ice cream. The table is also provided at one side, at its interior portion with a longitudinal series of vertical slots or openings 11 for the passage of a longitudinally disposed series of vertically reciprocating cutters 12 for severing the partially divided slab of ice cream after the same has been operated on by the transverse series of cutters 10. In the operation of the machine, as hereinafter more fully explained, a slab of ice cream is moved longitudinally from the front of the machine to the back thereof to pass the same through the transverse series of vertically reciprocating cutters and then the slab is moved transversely of the machine to pass the severed strips or pieces through the longitudinal series of vertically reciprocating cutters to complete the cutting of the ice cream. The thickness of the slab determines one of the dimensions of the completed blocks or pieces and the vertical cutters may be arranged at any desired intervals to cut the slab of ice cream into pieces having the other two dimensions of the required size.

The cutters 10 may consist of saws, knives or blades or any other cutting elements such as a fine wire and they are carried by a vertical reciprocating transversely disposed cutting frame, preferably composed of upper and lower horizontal I beams 14 and vertically connecting bars 15 located at opposite sides of the frame of the machine and suitably secured to the I beams. The I beams present front and rear, upper and lower horizontal flanges 16, to which the ends of the saw blades are secured by upper and lower bolts or members 17 and 18, provided at one end with kerfs 19 to receive the ends of the saw blades and secured to the same by keys or cotter pins 20 or suitable fastening devices and equipped at their outer ends by nuts 21 and 22, the upper nuts 22 being preferably in the form of wing nuts to enable them to be readily adjusted either by hand or a suitable tool for tightening the cutters to the desired tension. The front and rear flanges 16 of the I or channel beams enable a relatively large number of slots or openings to be provided in the horizontal members of the vertically reciprocating cutter frame, so that the cutters may, when required, be arranged relatively close together without liability of weakening the flanges of the said members.

The end bars of the transverse cutter frame are preferably rectangular in cross section and operate in guides 23 mounted between intermediate angle bars or frame members 24 which are located at opposite sides of the frame of the machine and which extend above the table thereof, as clearly illustrated in Figure 1 of the drawings. The guides 23, which are preferably arranged in pairs, are provided with end flanges and with a central recess 26 in which the end bars of the transverse cutting frame are secured by face plates 27 bolted or otherwise secured to the guides 23. The guides 23 extend between the spaced angle bars 24 and the end flanges 25 are secured to the inner faces of the said angle bars 24. By means of the guides 23 the transverse cutter frame is caused to reciprocate vertically for accurately cutting the ice cream slabs and lateral movement of the cutters is effectually prevented. The said vertical end bars 15 are provided intermediate of their ends with laterally projecting horizontally disposed pivot pins 28 for connecting the upper ends of links or pitmen 29 with wrist pins 30 of crank disks 31. The crank disks 31, which are suitably secured to the ends of a transverse shaft 32, are preferably weighted opposite the wrist pins, as clearly shown in Figure 1 of the drawings, to counterbalance the vertically reciprocating cutting frame but any other suitable means may, of course, be employed, either in addition to the weighted crank disks 31 or any substitution for the weights thereof to counterbalance properly the weight of the cutting frame and the cutters.

The transverse shaft 32, which is journaled in suitable bearings, is connected by suitable gearing such as a belt 33 and pulleys 34 and 35 with a front transverse shaft 36 preferably extending entirely across the machine, as shown and mounted in suitable bearings of the frame 1 and actuated by an electric motor 37, or other suitable means. The motor 37 is preferably connected by speed reducing gearing with the transverse shaft 36 and such speed reducing gearing may be conveniently in the form of a worm 38 carried by the motor shaft and meshing with the worm wheel 39 suitably mounted on the transverse shaft 36. The transverse shaft 36 is equipped with a slidable clutch member 40 keyed or otherwise slidably interlocked with the shaft and actuated by a clutch or shaft and lever 41 to engage it with and disengage it from a coacting clutch face 42 of a beveled gear 43 loose on the transverse shaft 36 and meshing with a beveled gear 44 suitably secured to the front end of a side longitudinal shaft 45. The said longitudinal shaft 45, which is journaled in suitable bearings of the frame, has mounted on it a spur gear 46 which meshes with a corresponding spur gear 47 of a crank shaft 48 connected by a link or pitman 49 with a vertically reciprocating side cutting frame 50, which has mounted in it a longitudinally disposed series of cutters 12. The clutch 40 enables the side cutting frame to be readily thrown into and out of operation so that the transverse and longitudinal cutters may be operated for making either one or more cuts through a slab of ice cream.

The side cutting frame 50 is preferably constructed substantially the same as the transverse cutting frame 15 and it is composed of upper and lower horizontal I beams 51 having their web portions suitably secured to vertical side bars 52 which are also connected at their lower ends by a bottom horizontal bar 53 to which the upper end of the link or pitman 49 is connected. Any other form of crank element may, of course, be employed for reciprocating the side cutting frame 50 from the side longitudinal shaft 45. The frame is provided with suitable guides 50ª for guiding the side cutting frame 50 and these guides may be of any desired construction.

The ice cream slab is moved along the table from front to rear to make the first cut by means of a transversely disposed slide 54 provided at the front with a suitable handle 55 and slidably mounted at its ends on longitudinal guide rods 56 which extend through openings of suitable bearings 57 which may be in the form of sleeves or any other suitable means whereby the slide is permitted to move freely along the horizontal longitudinally disposed rods 56. The transversely disposed slide is equipped with a plurality of blocks 58, which are spaced apart to correspond with the position of the cutters so that the blocks 58 may push the ice cream between and entirely clear of the transverse series of cutters in completing the first cut. The machine is provided with suitable means for limiting the rearward movement of the transverse slide which has end flanges 59 and 60 for engaging the slab of ice cream at the opposite ends thereof for maintaining the slab in proper position with relation to the slide and the flange 59 is beveled, as shown, to enable it to overlap a beveled portion 61 of a horizontal movable slide, whereby the slab of ice cream may be moved into the path of the transversely movable slide 62 preparatory to making the second cut of the slab. The rear transverse slide is guided at the rear end by a combined rear stop and guide 63 provided with a horizontal slot 64 receiving a reduced portion 65 of the transversely movable slide. The reduced portion 65 is retained in the slot 64 by a plate 66 and the said slide 62 is provided with a handle 67 for the convenience of the operator.

The machine is equipped at the transverse series of cutters with a combined presser plate and saw guard 68 mounted at its ends in suitable posts 69 and yieldably pressed downwardly by springs 70. The presser plate or member is provided with a curved lip 71 to enable the slab of ice cream to pass readily beneath it and it is adapted to maintain the top of the slab in a smooth condition and it prevents the cutters from lifting any of the ice cream from the slab in their vertical movement. The presser plate or member, provided with cutter receiving openings, 72 and the side cutters are equipped with a suitable guard 73 which may be in the form of a presser plate or member, if desired.

What is claimed is:—

1. An ice cream cutting machine including a frame, a table supported by the frame and adapted to receive a slab of ice cream and provided with means for circulating a temperature controlling medium to prevent the slab of ice cream from freezing to the table, and a vertical movable cutter operated through the table, said temperature controlling means being located in advance and in rear of the cutter.

2. An ice cream cutting machine, including a frame, a table supported by the frame and provided with a chamber for the circulation of a temperature controlling medium and having cutter guiding means located in said chamber and dividing the same, and cutting means having spaced cutters operating in the guiding means.

3. An ice cream cutting machine, including a frame, a table having a chamber for the circulation of a temperature controlling medium and provided with an integral connecting portion dividing the chamber and provided with cutter guiding openings, and cutting means having spaced cutters operating in the said openings.

4. An ice cream cutting machine, including a frame, a table supported by the frame and provided with a chamber for the circulation of temperature controlling means, said table having a thickened wall provided with cutter guiding openings, and cutting means having spaced cutters operating in the said openings.

5. An ice cream cutting machine, including a frame, a table supported by the frame and having a chamber for the circulation of a temperature controlling medium and provided with thickened side walls, said chamber being also provided with a transverse connecting portion dividing the chamber, said transverse portion and one of said walls being provided with cutter guiding openings, and cutting means having spaced cutters operating in the said openings.

6. An ice cream cutting machine, including a frame, a table supported by the frame and having a temperature controlling means, a transverse series of spaced cutters, side guides, a slide movable longitudinally of the machine and guided by the said guides and adapted to move a slab of ice cream through the said cutters.

7. An ice cream cutting machine, including a frame, a table supported by the frame, transverse and side cutters, a front slide movable lengthwise of the machine, a rear slide movable transversely of the machine, said slides having beveled portions arranged to overlap, and means for guiding the slides.

8. An ice cream cutting machine, including a frame, a table mounted on the frame, transverse and side cutters, means for reciprocating the cutters vertically, a front slide movable longitudinally of the machine, a rear slide movable transversely of the machine, and a combined rear stop and guide having means for guiding the rear slide.

In testimony whereof I have hereunto set my hand.

SILAS D. BRACKEN.